June 18, 1929.  J. E. LUTON  1,718,162
VEHICLE SIGNAL
Filed Aug. 13, 1928   2 Sheets-Sheet 1
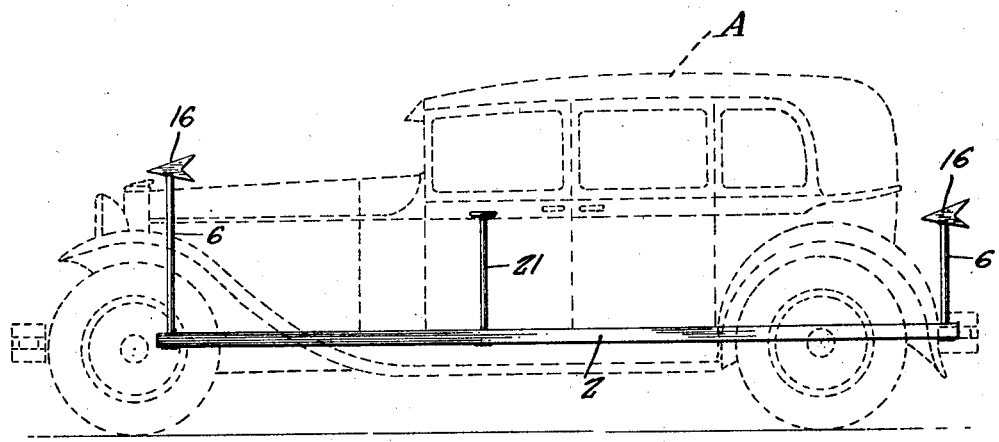
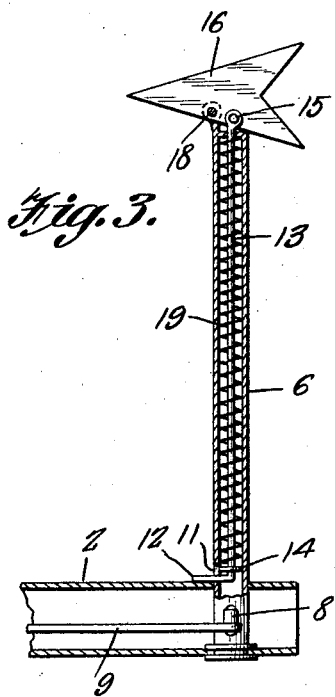 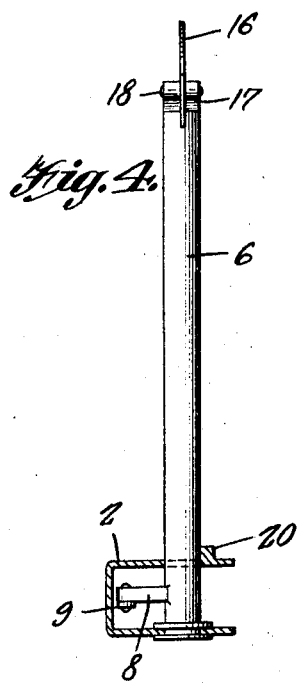
James E. Luton,
INVENTOR June 18, 1929.  J. E. LUTON  1,718,162
VEHICLE SIGNAL
Filed Aug. 13, 1928  2 Sheets-Sheet 2
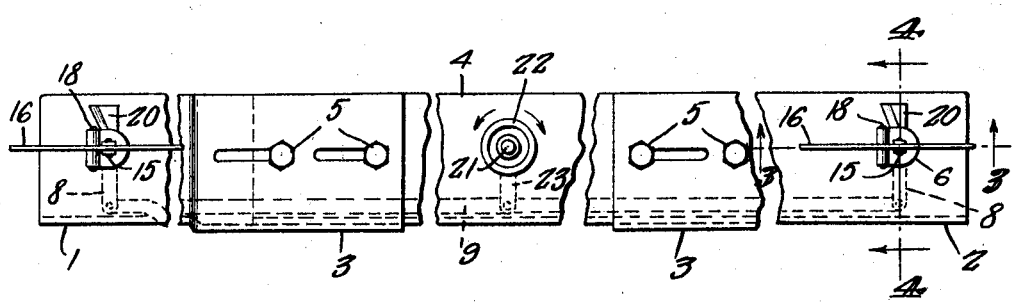
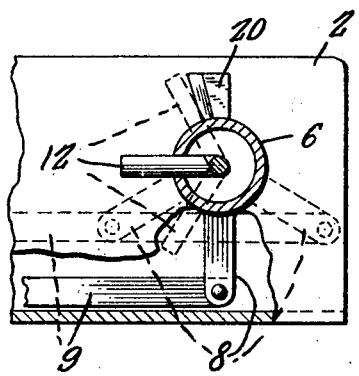
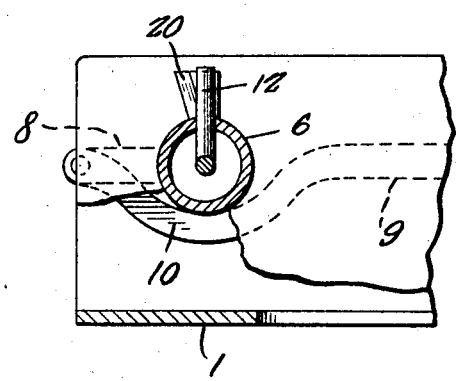
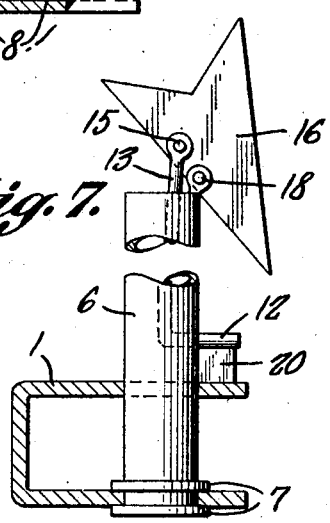
James E. Luton,
INVENTOR
BY Victor J. Evans
ATTORNEY Patented June 18, 1929.

1,718,162

UNITED STATES PATENT OFFICE.

JAMES EZRA LUTON, OF MESA, ARIZONA.

VEHICLE SIGNAL.

Application filed August 13, 1928. Serial No. 299,395.

This invention relates to vehicle signals, and its general object is to provide a signalling apparatus constructed and designed to be installed on a motor vehicle in a manner whereby the signalling indicators thereof can be seen from all angles and directions, with the result the driving intentions of the operator of the vehicle equipped with the apparatus can be ascertained at a glance by occupants of other vehicles, as well as pedestrians.

Another object of the invention is to provide a signalling apparatus for motor vehicles, that can be easily and expeditiously installed on all types and sizes of motor vehicles and is adjustable for that purpose.

A further object of the invention is to provide a vehicle signal that is simple in construction, inexpensive to manufacture and efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a side elevation of a vehicle shown in dotted lines with my signal installed thereon.

Figure 2 is a top plan view of the signal per se, with parts broken away for the purposes of illustration.

Figure 3 is a sectional view taken approximately on line 3—3 of Figure 2 looking in the direction of the arrows.

Figure 4 is a sectional view taken approximately on line 4—4 of Figure 2, looking in the direction of the arrows.

Figure 5 is a fragmentary sectional view illustrating the rear end of the signalling apparatus and showing the respective positions assumed by the parts in full and dotted lines.

Figure 6 is a similar view of the front end of the signalling apparatus with the parts shown in a single position.

Figure 7 is a fragmentary sectional view showing one of the direction indicators arranged to indicate that the vehicle equipped therewith is about to stop.

Referring to the drawings in detail, the letter A indicates a motor vehicle of the sedan type, but I want it understood that my signalling apparatus can be installed on any type of motor vehicle including motor trucks without departing from the spirit of the invention.

The apparatus includes channel frame members two of which are end members and are referred to by the reference numerals 1 and 2 and these end members have their inner ends telescopically mounted in securing members 3 which telescopically receive the ends of an intermediate member 4. The securing members are slotted and the slots are adapted to be aligned with corresponding slots formed in the members 1, 2 and 4 for the purpose of receiving bolt and nut connections 5 for securing all of the members in adjusted position as will be apparent. By this construction, the channel frame members can be adjusted to provide a structure of various lengths for the purpose of fitting various sizes of vehicles.

The channel frame members of course each include parallel walls which are disposed in a horizontal plane as best shown in Figure 7, and rising from the end members 1 and 2 adjacent the outer ends thereof are uprights 6 which are provided with spaced parallel annular flanges 7 providing bearings disposed upon the upper and lower surfaces of the lower parallel wall of the end members, and the uprights are mounted for rotation and pass through the upper parallel wall. The uprights are in the form of tubes and have extending laterally from the portions thereof that are disposed between the said parallel walls, lugs 8 which have pivotally secured to their outer ends, a link rod 9. The link rod 9 adjacent its connection with the lug 8 of the forward tubular upright is curved upon itself as at 10 for a purpose which will be apparent.

The tubular uprights have arranged therein slots 11 for the purpose of receiving the right angle disposed lower ends 12 of upright rods 13, one of which is provided for each tubular member and is disposed therein for slidable movement as best shown in Figure 3 of the drawings. The lower ends of the upright rods 10 have fixed thereto a collar 14 in the form of a disk, while the upper ends of these rods pass through openings formed in the upper ends of the tubular uprights. The upper ends of the upright rods terminate in eyes 15.

Pivotally secured in the eyes 15 of the upright rods 13 are the signal indicating arms which as shown are in the form of arrow heads and are indicated by the reference numeral 16. The upper ends of the tubular uprights have formed therewith spaced apertured ears 17 through which are passed pivot pins 18 which pivotally receive the arrow heads 16 as best shown in Figure 3. Surrounding the upright rods 13 are coil springs 19 which have their end convolutions engaging the collars 14 and the upper ends of the tubular uprights for the purpose of normally retaining the arrow head in the position as shown in Figure 3, and formed with the upper surface of the upper parallel wall of the channel frame members are cam blocks 20 which are arranged in the path of the right angle bent lower ends 12 of the upright rods 13.

Secured to the intermediate member 4 and rising therefrom is an intermediate tubular member 21 which is likewise provided with flanges at its lower end for receiving the lower wall of the intermediate member and is mounted for rotation in said member. Formed with the upper end of the upright tubular member 21 is a hand wheel 22, while extending from its lower end is a lug 23 which is pivotally secured to the link rod 9 intermediate its ends as best shown in Figure 2.

From the above description and disclosure of the drawings, it will be obvious that the arrow heads can be controlled from the driver's seat of the vehicle through the instrumentality of the hand wheel 22 and certain movements of the hand wheel will dispose the arrow heads in a manner whereby they can be directed either to the right or to the left, and this movement will rotate the tubular uprights for moving the arrow heads accordingly. A further movement of the tubular uprights by the hand wheel will dispose the right angle arranged lower ends 12 in engagement with the cam blocks 20 which will result in the raising of the upright rods 13 and when the rods are raised accordingly, the arrow heads are pointed downwardly to a position as shown in Figure 7. When in this latter mentioned position, the arrow heads indicate that the vehicle is to stop, and when the arrow heads are pointed to the left, they indicate that the vehicle is to be turned to the left, and of course when the arrow heads point toward the right the vehicle is to be turned accordingly.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A vehicle signal of the character described comprising a plurality of telescopically mounted channel frame members, means for securing the channel frame members in adjusted position, end members and an intermediate member included in the channel frame members, tubular uprights mounted for rotation adjacent the outer ends of the end members, a tubular upright mounted for rotation in the intermediate member and rising therefrom, parallel annular flanges formed with the tubular uprights and providing bearings engageable with the channel frame members for securing the uprights with respect thereto, indicating means pivotally secured to the uprights of the end members, means for rotating the signalling means by their tubular uprights, a handle secured to the tubular upright of the intermediate member for controlling the rotation of the signalling automatic means, and means cooperating with the controlling means for raising and lowering the signalling means.

2. A vehicle signalling apparatus comprising end channel frame members, an intermediate channel frame member, means for telescopically receiving the channel frame members, means for adjustably securing the channel frame members with the means first mentioned, said channel frame members being adapted to be secured adjacent one side of a motor vehicle, signalling means carried by the channel frame members, means for controlling the signalling means from the driver's seat of said vehicle and automatic means cooperating therewith for inclining the signalling means for the purpose specified.

3. A signalling apparatus of the character described comprising a plurality of telescopically mounted channel frame members, end members and an intermediate member included in said frame members, rotatably mounted upright tubular members carried by the end members, signalling means in the form of arrow heads pivotally secured to the upper ends of the tubular uprights, spring pressed rods pivotally secured to the arrow heads, a right angle bent end formed on each rod and passing through a slot arranged adjacent the bottom of the tubular uprights, cam blocks arranged in the path of the right angle bent ends and means for simultaneously rotating the tubular uprights as and for the purpose specified.

In testimony whereof I affix my signature.

JAMES EZRA LUTON.